US011349255B1

(12) United States Patent
Fox

(10) Patent No.: US 11,349,255 B1
(45) Date of Patent: May 31, 2022

(54) CONNECTOR HOUSING ASSEMBLY HAVING A PIN PROTECTOR PLATE

(71) Applicant: Sumitomo Wiring Systems, Ltd., Yokkaichi (JP)

(72) Inventor: George Fox, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/131,157

(22) Filed: Dec. 22, 2020

(51) Int. Cl.
*H01R 13/627* (2006.01)

(52) U.S. Cl.
CPC ................ *H01R 13/6273* (2013.01)

(58) Field of Classification Search
CPC .......... H01R 13/4538; H01R 13/6273
USPC .......... 439/140, 141, 136, 426, 381
See application file for complete search history.

(56) References Cited

U.S. PATENT DOCUMENTS

| 8,038,455 | B1* | 10/2011 | Moraes | H01R 13/4538 |
| | | | | 439/140 |
| 2004/0147158 | A1* | 7/2004 | Hobbs | H01R 13/62938 |
| | | | | 439/378 |
| 2019/0372269 | A1* | 12/2019 | Hirota | H01R 13/631 |

* cited by examiner

Primary Examiner — Gary F Paumen
(74) Attorney, Agent, or Firm — Honigman LLP

(57) ABSTRACT

A connector assembly disclosed herein includes a male connector housing, female connector housing and a pin protector plate. The male connector housing includes a resilient finger having an engagement member spaced apart from an upper catch. The female connector housing includes a protruding member axially offset from a retention member. The pin protector plate is disposed between the male connector housing and the female connector housing and includes a tab and a peripheral catch. The tab projects upwardly from the base and is axially offset from the peripheral catch. The pin protector plate is movable from a locked position to a pre-stage position. Wherein the female connector housing is configured to move the pin protector in a pre-stage position when the female connector housing is removed. Accordingly, the male terminal blades remain protected during the servicing of the connector assembly.

15 Claims, 19 Drawing Sheets

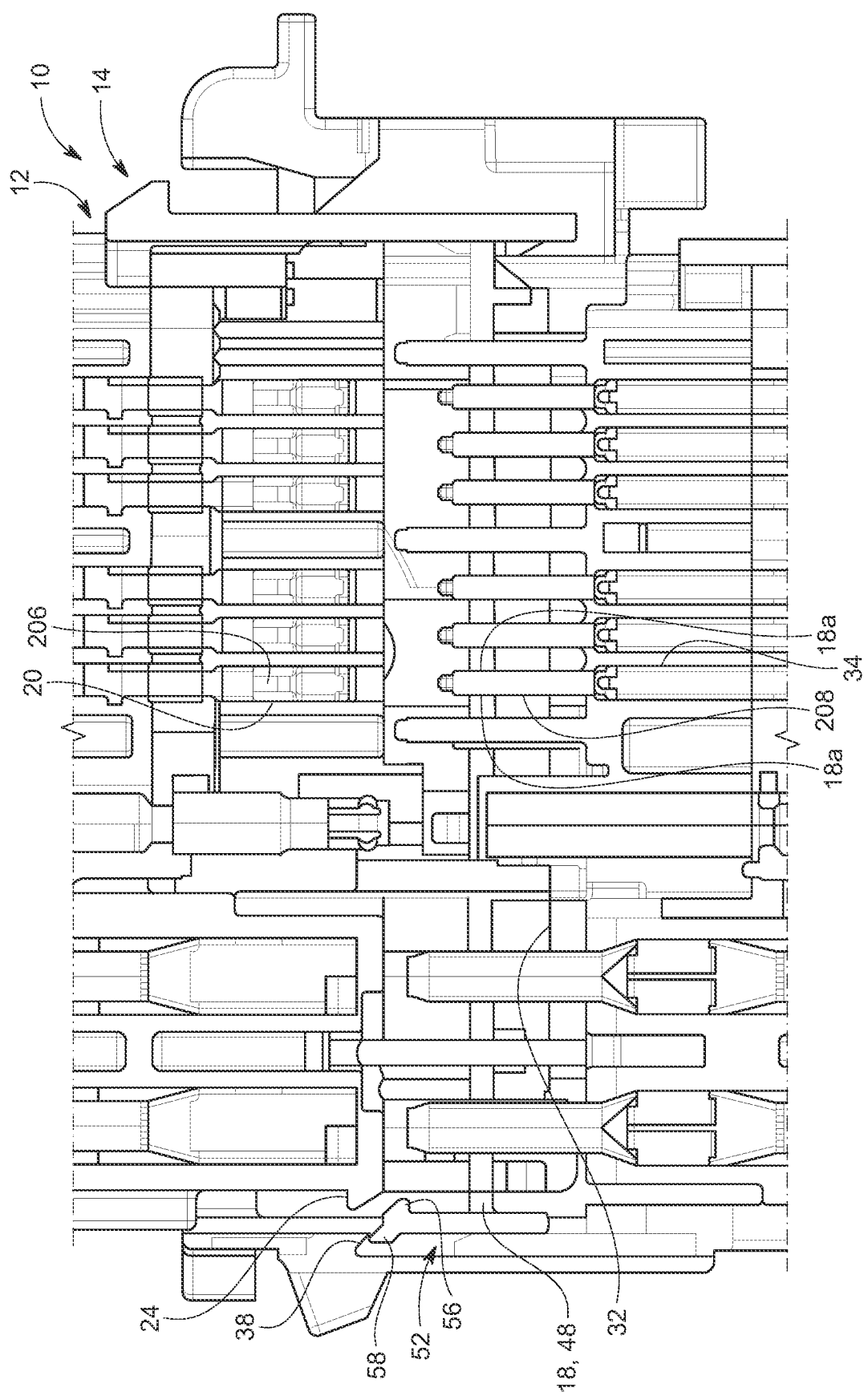

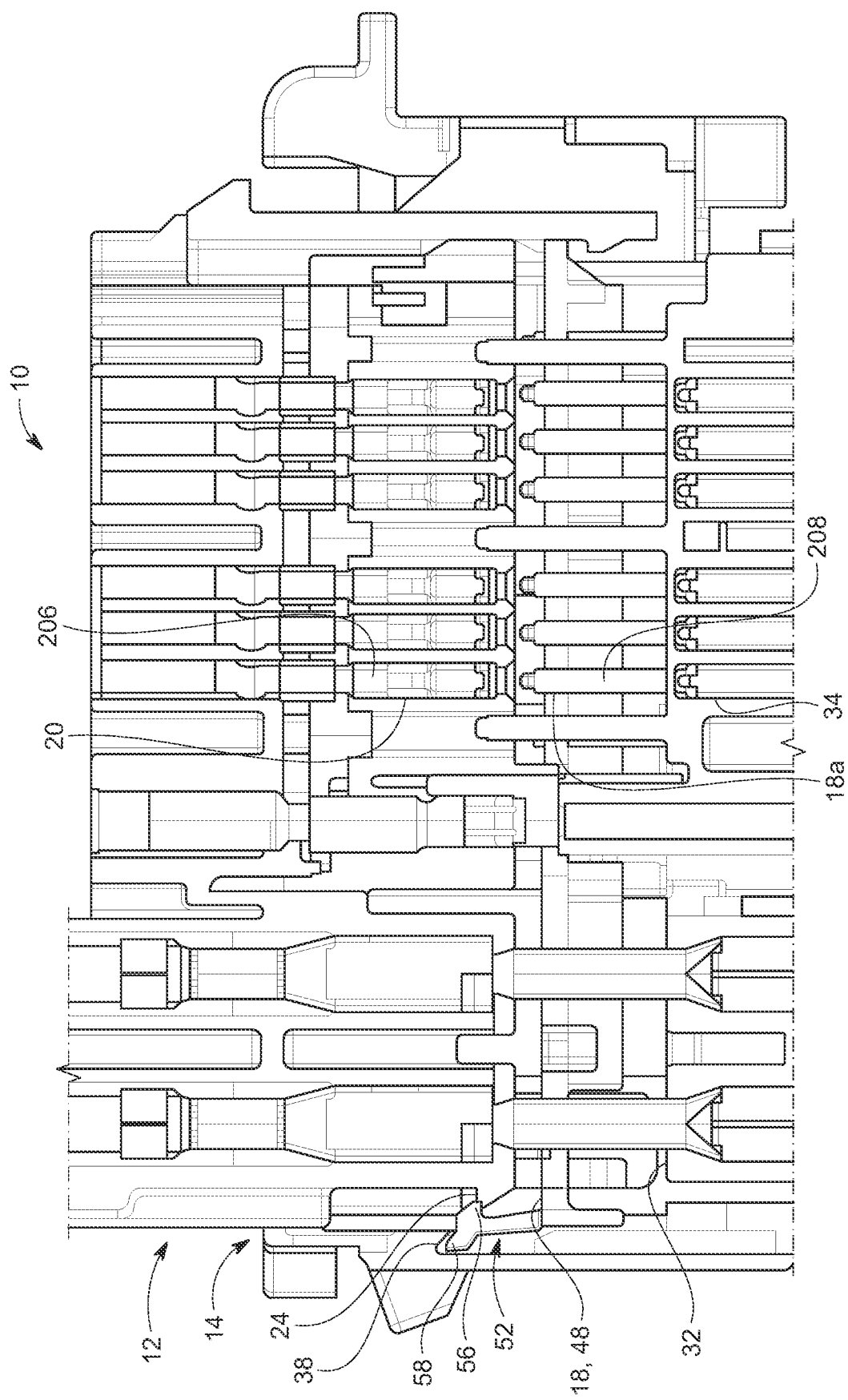

CONNECTOR HOUSING ASSEMBLY HAVING A PIN PROTECTOR PLATE

TECHNICAL FIELD

This disclosure relates to a connector housing assembly.

BACKGROUND

Connector housings include a male connector housing and a female female housing. The male connector housing is configured to hold terminal blades and the female connector housing includes female connectors configured to receive the blades so as to complete an electric connection. A pin protector is sandwiched between the male and female housings helps maintain the orientation of the terminal blades so as to ensure the terminal blades are registered to a respective connector. As such, the pin protector helps the terminal blades from being bent or otherwise damaged.

Currently, the pin protector plate is movable from a pre-stage position it a locked position. In the pre-stage position, the pin protector plate is held in suspension above a top surface of the male housing. To move the pin protector plate into the locked position, the female connector housing is pressed onto the pin protector plate and pushes the pin protector plate against the male housing.

In the locked position, the male connector housing, female connector housing and the pin protector plate are locked together. It should be appreciated that the female connector housing may be removed for servicing. Removal of the female connector housing requires a tool and leaves the male terminals exposed and extending beyond the exposed surface of the pin protector plate.

Accordingly, it remains desirable to have a connector assembly wherein the pin protector plate may be left in the pre-stage position when the female connector is removed so as to protect the male terminals.

SUMMARY

A connector assembly disclosed herein includes a male connector housing having a wall bounding a space. The male connector housing includes a resilient finger having an engagement member spaced apart from an upper catch. The connector assembly includes a female connector housing and a pin protector plate. The female connector housing includes a protruding member axially offset from a retention member. The pin protector plate is disposed between the male connector housing and the female connector housing. The pin protector plate includes a tab and a base. The base has a peripheral edge defining a peripheral catch. The tab projects upwardly from the base and is axially offset from the peripheral catch.

The pin protector plate is movable from a locked position to a pre-stage position. In the locked position the peripheral catch of the pin protector plate is disposed beneath the resilient finger and the female connector housing is seated against the pin protector plate the protruding member is also disposed under the engagement member. In the pre-stage position, the pin protector plate is engaged with the engagement member. When the female connector housing is pulled out of the male housing, the female connector housing is configured to: (1) move the pin protector plate from the locked position to the pre-stage position; and (2) disengage from the pin protector plate. Wherein, the protruding member engages the resilient finger and urges the resilient finger outwardly.

Concurrently, the retention member engages the tab so as to carry the pin protector plate upwardly. The pin protector is carried upwardly by the retention member until the tab engages the upper catch. The upper catch pulls the tab away from the retention member releasing the tab from the retention member. The protruding member is pulled clear of the engagement member so as to place the resilient finger and the tab to a normal state and the peripheral catch of the pin protector plate is engaged with the engagement member.

In one aspect, the engagement member includes an upper ramp defining a first catch surface and a lower ramp defining a second catch surface.

In one aspect, the upper catch is elevated with respect to the engagement member.

In one aspect, the upper catch is axially offset from the engagement member.

In one aspect, the upper ramp projects inwardly in a direction from a top surface to a bottom surface of the resilient finger, and the lower ramp projects inwardly in a direction from the bottom surface to the top surface of the resilient finger.

In one aspect, the lower ramp is a pair of lower ramps spaced apart from each other and coaxial to each other.

In one aspect, the protruding member is a cuboidal member having an arcuate top surface.

In one aspect, the retention member includes a planar surface generally orthogonal to a side surface of the retention member.

In one aspect, the female connector housing includes a rib disposed on a side surface of female connector housing, the protruding member and the retention member disposed on an undersurface of the rib.

In one aspect, the pin protector plate includes a peripheral wall bounding a periphery of the base.

In one aspect, the catch is defined by an indent disposed on a top surface of the base.

In one aspect, the tab is a planar member having an inward catch and an outward catch, the inward catch and the outward catch disposed on a top portion of the tab.

In one aspect, the outward catch projects upwardly at an angle from the top portion of the tab.

In one aspect, the inward catch is a pair of inward catches, each of the pair of inward catches spaced apart from each other.

In one aspect, the tab has a travel configured to place the peripheral catch of the pin protector plate into engagement with the engagement member of the resilient finger when the upper catch pulls the tab free of engagement with the retention member of the female connector housing.

Accordingly, a connector assembly is provided which places the pin protector in a pre-stage position by simply removing the female connector housing, thus the male terminal blades remain protected during the servicing of the connector assembly.

DESCRIPTION OF DRAWINGS

FIG. 7A is a cross-sectional view showing the female connector housing and the pin protector plate prior to a pre-stage position;

FIG. 11A is a cross-sectional view showing the connector assembly showing the female connector housing moved up relative to FIG. 10A;

DETAILED DESCRIPTION

Figure 1:
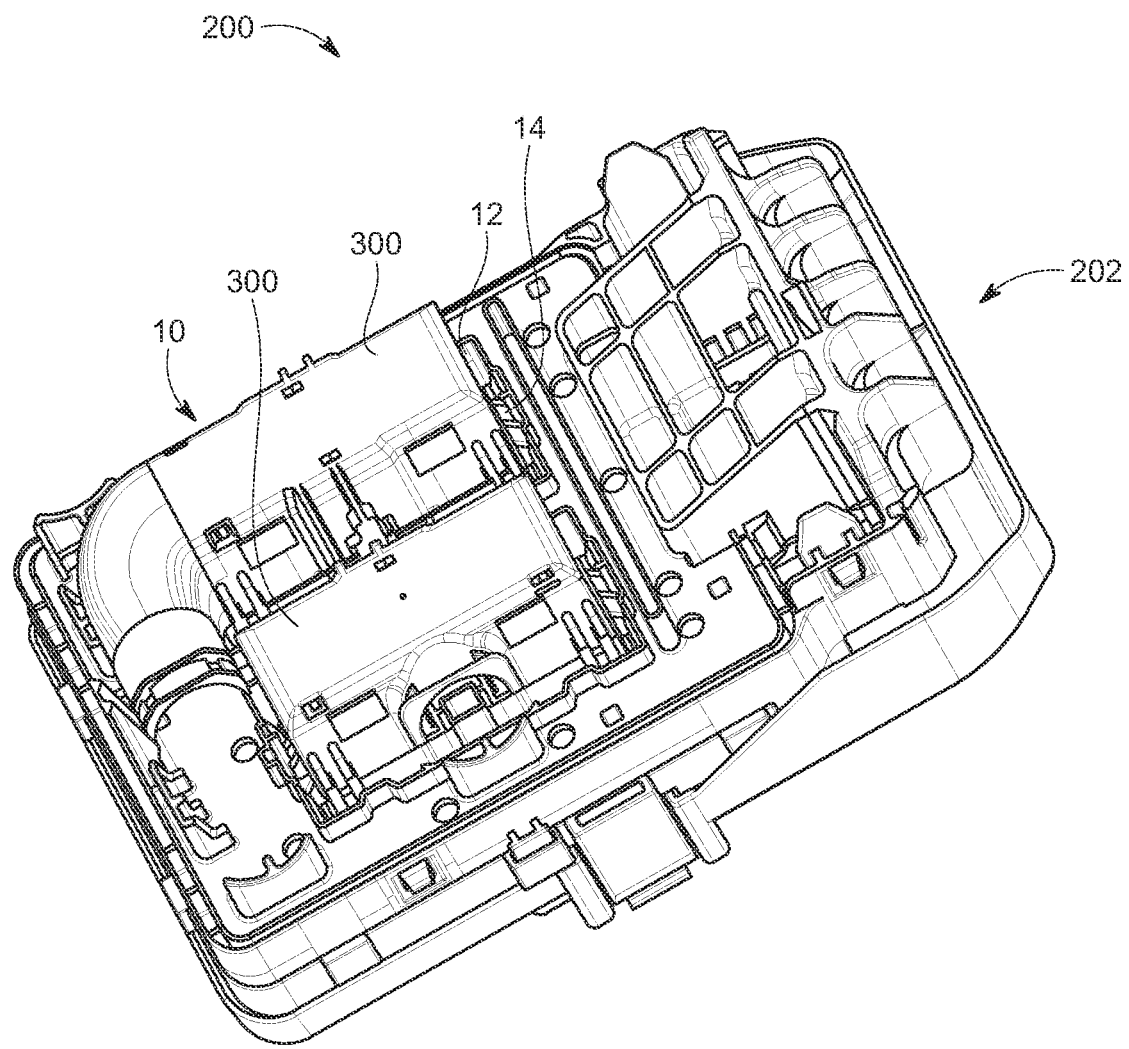
FIG. 1 is a perspective view of a connector assembly housing according to the principles of the present disclosure.

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

For consistency and convenience, directional adjectives are employed throughout this detailed description corresponding to the illustrated embodiments. The term "axial" as used throughout this detailed description and in the claims refers to a direction extending a length of a part. Also, the term "lateral" as used throughout this detailed description and in the claims refers to a direction extending a width of a part. In other words, the lateral direction may extend between opposing sides of a part along an axis orthogonal to the axial length. Furthermore, the term "vertical" or "upwardly" as used throughout this detailed description and in the claims refers to a direction generally perpendicular to a lateral and longitudinal direction of the part as shown in the referenced figure. The term "outwardly" refers to a direction extending outward from a center of the part being referenced. Likewise, the term inwardly refers to a direction extending towards a center of the part being referenced. It will be understood that each of these directional adjectives may be applied to individual components of a part.

A connector assembly disclosed herein includes a male connector housing, female connector housing and a pin protector plate. The male connector housing includes a resilient finger having an engagement member spaced apart and axially offset from an upper catch. The female connector housing includes a protruding member axially offset from a retention member. The pin protector plate is disposed between the male connector housing and the female connector housing and includes a tab and a peripheral catch. The tab projects upwardly from the base and is axially offset from the peripheral catch. The pin protector plate is movable from a locked position to a pre-stage position. As the female connector housing is removed, the retention member pulls the tab of the pin protector plate upwardly until the tab engages the upper catch. When the upper catch engages the tab, the tab is released from the retention member. Concurrently, the protruding member urges the resilient finger outwardly, wherein protruding member passes the engagement member of the resilient finger, allowing the resilient finger to return to a normal position wherein the engagement feature is configured to engage the peripheral catch of the pin protector plate, the engagement feature having a tolerance sufficient to allow the pin protector to drop so as to release the tab from engagement with the upper catch and retain the pin protector in a pre-stage position. Accordingly, the female connector housing is configured to move the pin protector in a pre-stage position when the female connector housing is removed. In the pre-stage position, the male terminal blades remain protected during the servicing of the connector assembly.

With reference first to FIG. 1, an illustrative depiction of a connector assembly housing 10 is provided. The connector assembly housing 10 may be integrated into a power distribution box 200. The power distribution box 200 is shown as having a lower housing 202 mounted to a lower cover 204. It should be appreciated that the lower housing 202 may be covered by an upper cover (not shown). The connector assembly housing 10 may include a dress cover 300 configured to guide wires (not shown) along a predetermined wire routing path. The power distribution box 200 and the connector assembly housing 10 may be formed of a material suitable for injection molding, illustratively including polypropylene, Acrylonitrile butadiene styrene, polyoxymethylene, polycarbonate and the like.

The connector assembly housing 10 includes a female connector housing 12 mounted onto a male connector housing 14. For illustrative purposes, the power distribution box 200 is shown as having two connector assembly housings 10, each connector assembly housing 10 is arranged in a side-by-side relationship with each other. However, it should be appreciated that the power distribution box 200 may include a single connector assembly housing 10 or three or more connector assembly housings 10. The connector assembly housings 10 are the same and thus a description of the connector assembly housing 10 disclosed herein will be made with reference to one.

Figure 2:
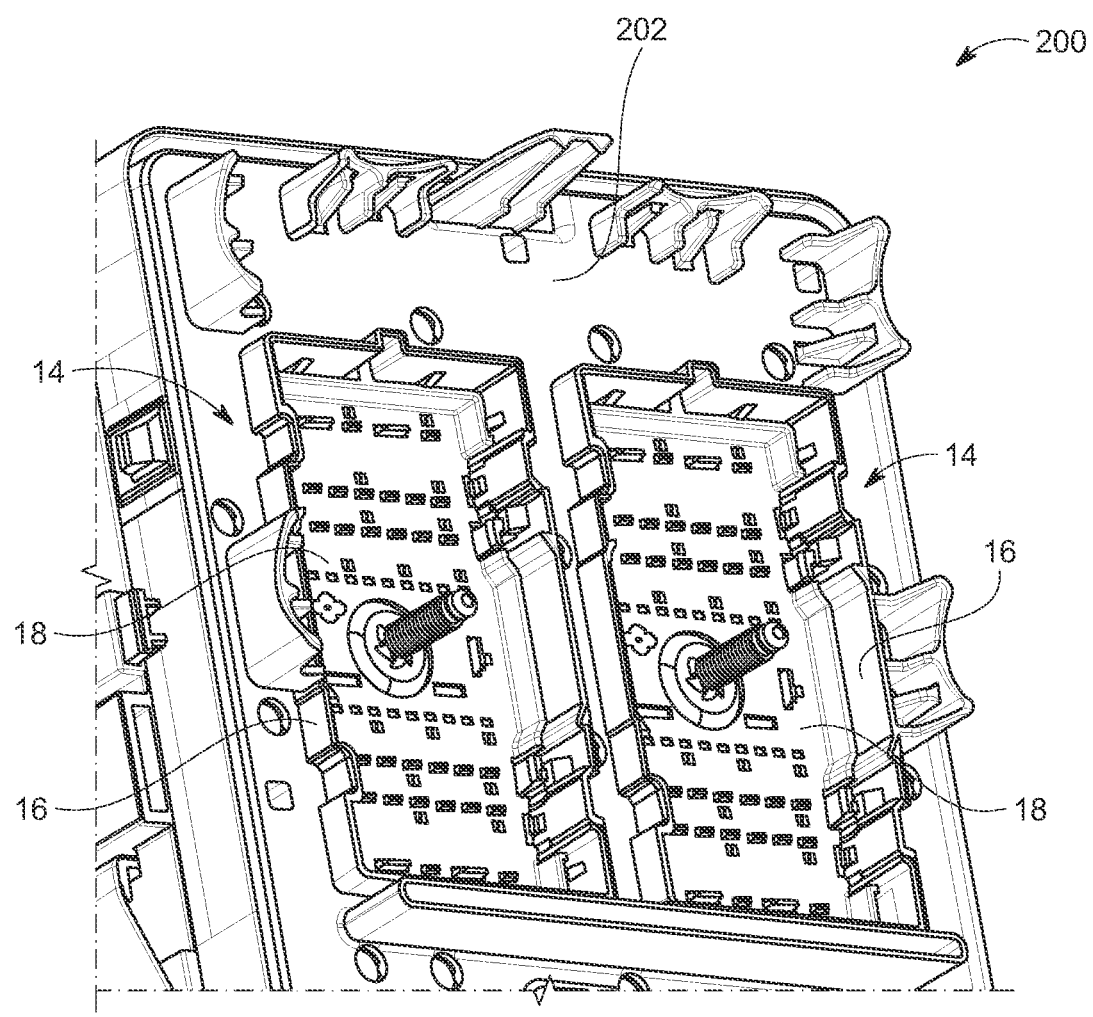
FIG. 2 is a view of FIG. 1 the female connector housings removed.

With reference now to FIG. 2, a depiction of the power distribution box 200 is shown with the female connector housings 12 removed from the male connector housings 14. The male connector housings 14 are formed on the lower housing 202. In particular, the lower housing 202 includes an inner wall 16 bounding a space configured to receive the female connector housing 12 so as to define the male connector housing 14. A pin protector plate 18 is disposed in the male connector housing 14.

Figure 3:
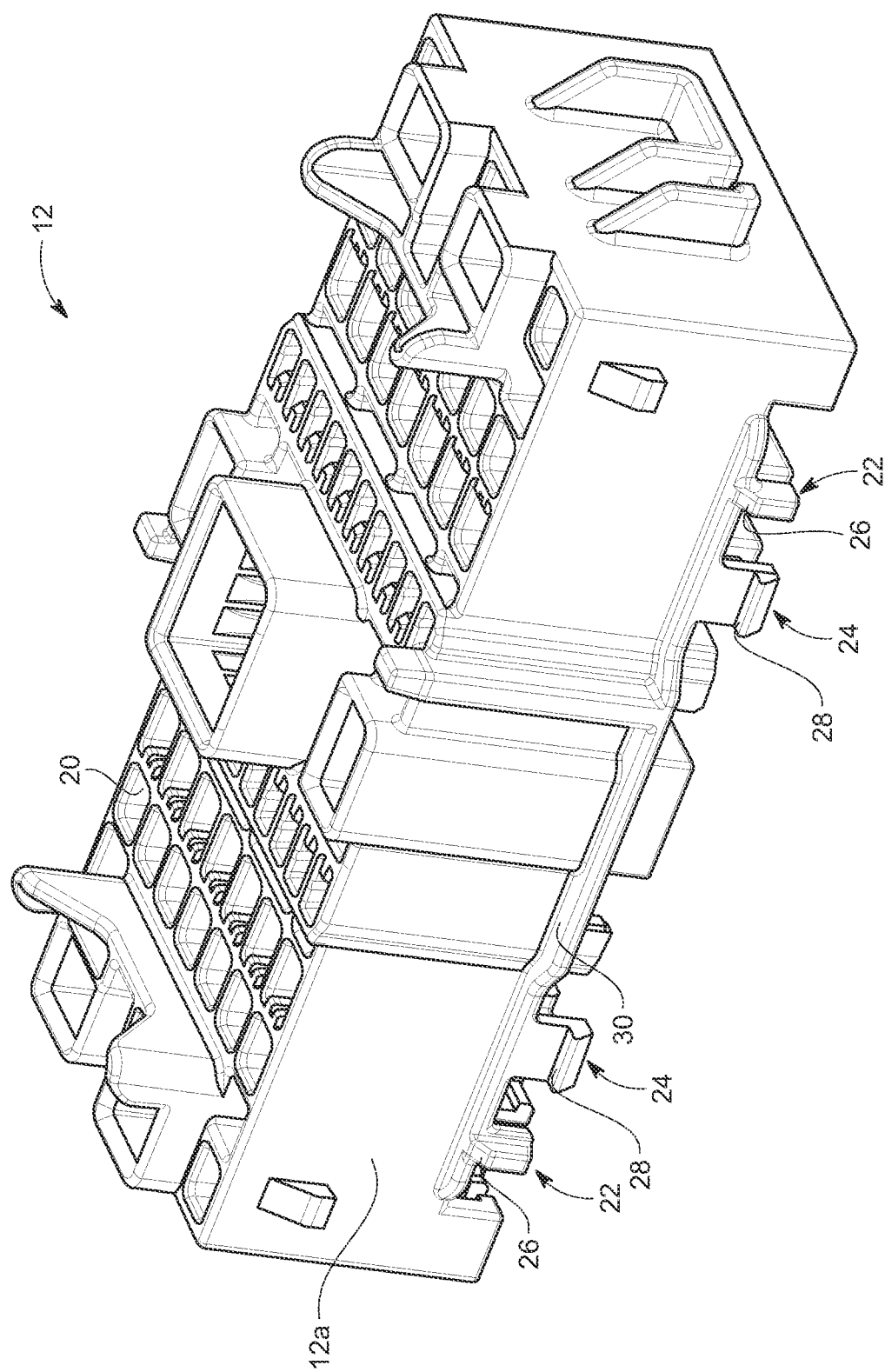
FIG. 3 is a perspective view of a female connector housing according to the principles of the present disclosure.

With reference now to FIG. 3, a depiction of the female connector housing 12 in accordance with one or more embodiments disclosed herein is provided. The female connector housing 12 includes a side wall 12a defining a generally cuboidal member. The female connector housing 12 includes a plurality of slots 20 for receiving a female terminal 206 (shown in FIGS. 7A-12C). The female connector housing 12 may further include features for facilitating an electric connection such as a relay housing or the like.

The female connector housing 12 includes a protruding member 22 axially offset from a retention member 24. The protruding member 22 is disposed on a bottom portion of the side wall 12a of the female connector housing 12. In one aspect, the protruding member 22 is a cuboidal member having an arcuate top surface 26. The arcuate top surface 26 forms a generally bulbous member. A bottom of the protruding member 22 may be relatively flat so as to form a right angle with respect to an outer surface of the protruding member 22. The protruding member 22 is adjacent a back of the female connector housing 12 relative to the retention member 24.

The retention member 24 is a planar member extending from a bottom of the side wall 12a of the female connector housing 12. The retention member 24 is resilient so as to flex inwardly with respect to the female connector housing 12 and return to its natural state. As used herein, the term "natural state" refers to the state of a part when no forces are exerted on the part. The distal end of the retention member 24 is configured to engage a pin protector plate 18, as described in more detail below. In one aspect, the retention member 24 includes a planar surface 28 generally orthogonal to a side surface of the retention member 24 so as to project outwardly from the side surface of the retention member 24. The planar surface 28 has a width as measure by the longitudinal length of the female connector housing 12 which is greater than a width of the protruding member 22.

In one aspect, the female connector housing 12 includes a rib 30 disposed on the side wall 12a of the female connector housing 12. The protruding member 22 and the retention member 24 are disposed on an undersurface of the rib 30 so as to extend downwardly from the rib 30. Preferably, the planar surface 28 of the retention member 24 is disposed on a plane beneath the bottom surface of the protruding member 22.

Figure 4A:
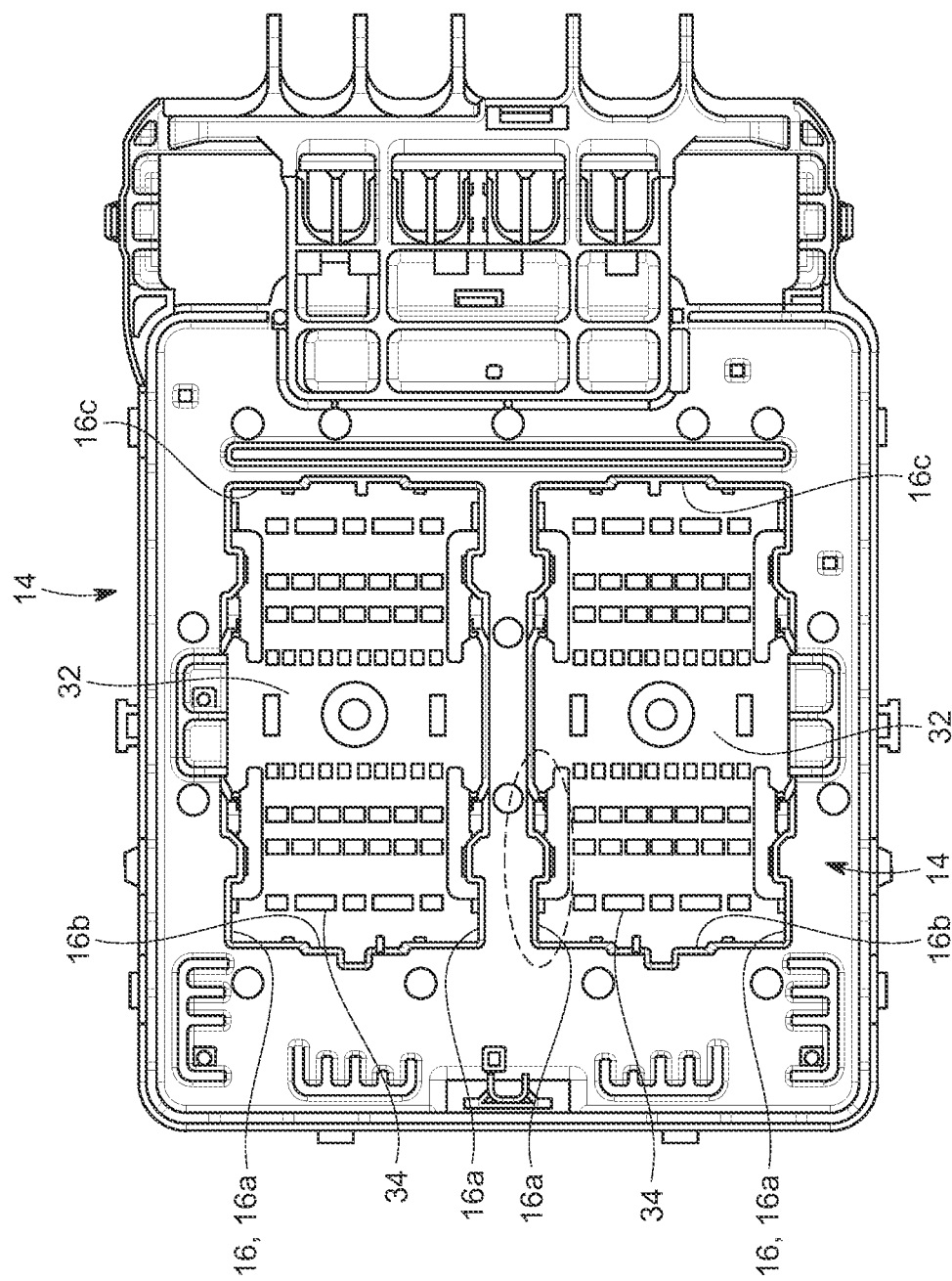
FIG. 4A is a top down view of the male connector housing shown in FIG. 1.
Figure 4B:
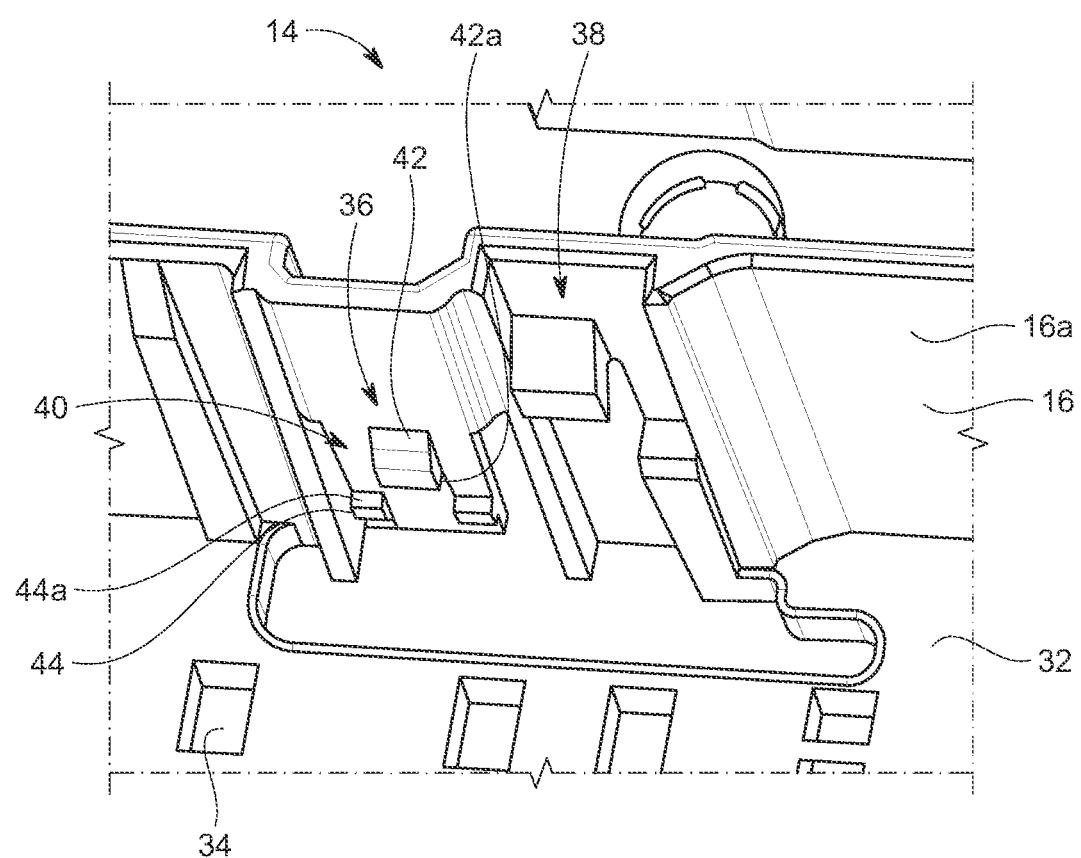
FIG. 4B is a close up view of one of the pair of the resilient fingers and upper catches shown in FIG. 4A.

With reference now to FIGS. 4A and 4B, a description of the male connector housing 14 is provided. As shown in FIG. 4A, the inner wall 16 of the male connector housing 14 includes a pair of inner side walls 16a spaced apart from each other and a front inner side wall 16b spaced apart and opposite to a back inner side wall 16c. The inner side wall 16a extends upwardly from a lower plate 32. The lower plate 32 includes a plurality of terminal slots 34 for receiving male terminal blades 208. The male terminal blades 208 are positioned to extend upwardly from the lower plate 32 (as shown in FIGS. 7A-12C). The depiction of the male connector housing 14 shown in FIGS. 4A and 4B provide an example where each of the inner side walls 16a includes a pair of resilient fingers 36 and a pair of upper catches 38.

FIG. 4B is a close up view of one of the pair of the resilient fingers 36 and upper catches 38. The resilient finger 36 includes an engagement member 40. The resilient finger 36 is spaced from the upper catch 38. In particular, the upper catch 38 is axially offset from the engagement member 40. The resilient finger 36 is configured to deflect outwardly with respect to a center of the male connector housing 14 and return to its natural state as shown in FIG. 4B.

The upper catch 38 is disposed on the inner side wall 16a of the male connector housing 14. The upper catch 38 is a generally rigid member protruding inwardly from the inner side wall 16a. The upper catch 38 protrudes inwardly further than the engagement member 40. The upper catch 38 is elevated with respect to the lower plate 32 and is higher than the engagement member 40 of the resilient finger 36. A bottom surface of the upper catch 38 is angled so as to form an acute angle with respect to the inner wall 16.

The engagement member 40 includes an upper ramp 42 defining a first catch surface 42a and a lower ramp 44 defining a second catch surface 44a. The first catch surface 42a and the second catch surface 44a are spaced apart from each other and face each other. The upper ramp 42 projects inwardly in a direction from a top surface to a bottom surface of the resilient finger 36, and the lower ramp 44 projects inwardly in a direction from the bottom surface to the top surface of the resilient finger 36. In one aspect, the engagement member 40 includes a pair of lower ramps 44 spaced apart from each other and coaxial to each other. The lower ramps 44 are spaced apart from each other a distance equal to or greater than the width of the upper ramp 42.

Figure 5:
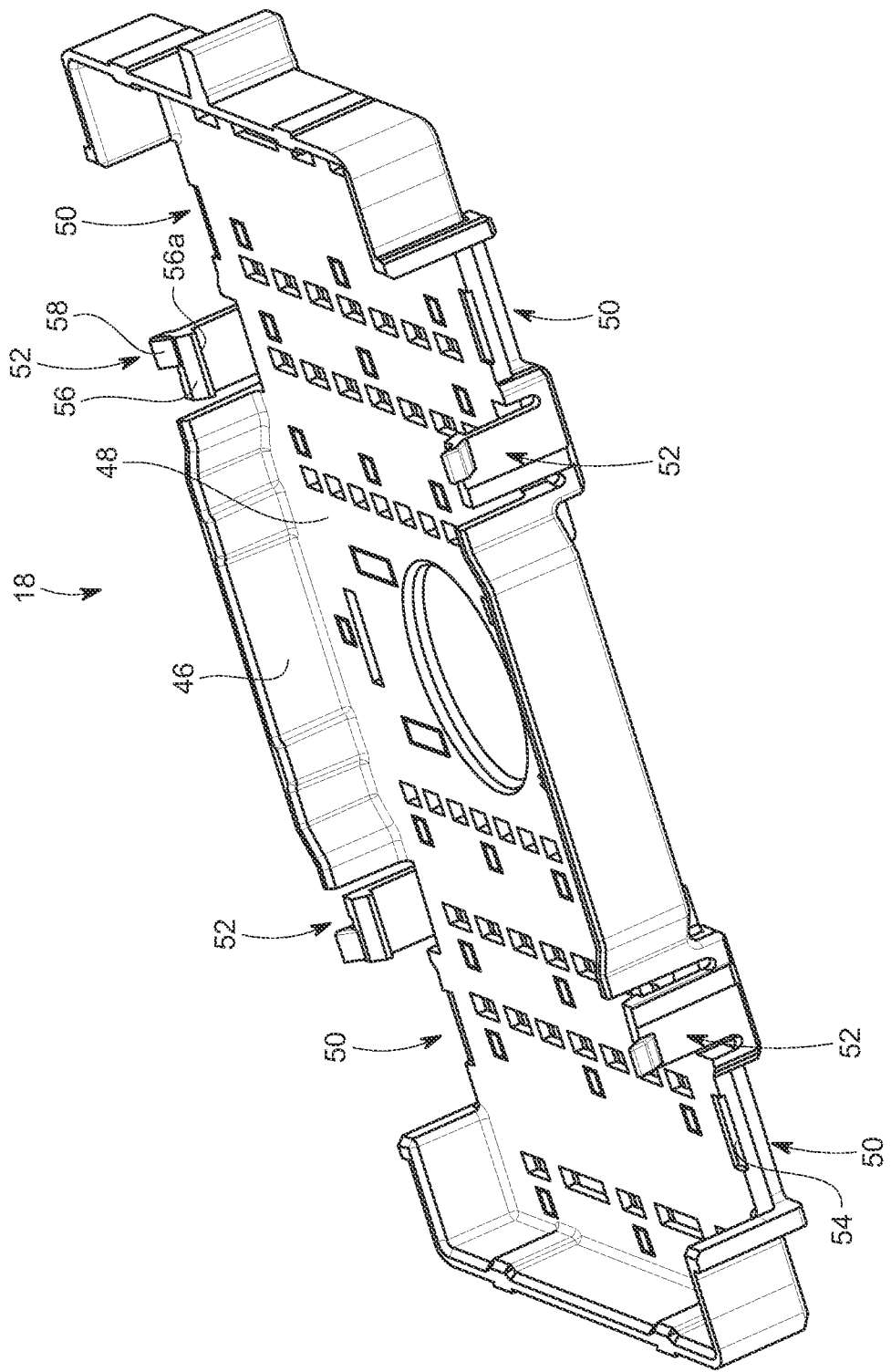
FIG. 5 is a cross-sectional view of FIG. 1 taken along line 5-5.

With reference now to FIG. 5, a description of the pin protector plate 18 is provided. The pin protector plate 18 is disposed between the male connector housing 14 and the female connector housing 12, as shown in FIGS. 7A-12C. The pin protector plate 18 includes a peripheral wall 46 bounding a base 48. A plurality of terminal slots 18a are disposed on the base 48. The terminal slots 18a are configured to receive a corresponding male terminal blade 208. The peripheral wall 46 includes an opening along the peripheral edge of the base 48 so as define a peripheral catch 50. The pin protector plate 18 further includes a tab 52. The tab 52 projects upwardly from the base 48 and is axially offset from the peripheral catch 50. The tab 52 is configured to deflect outwardly from the peripheral edge of the base 48.

In one aspect, the peripheral catch 50 is defined by an indent 54 disposed on a top surface of the base 48. The indent 54 has a length and a width configured to receive the first catch surface 42a of the upper ramp 42. In one aspect, the tab 52 is a planar member having an inward catch 56 and an outward catch 58, the inward catch 56 and the outward catch 58 disposed on a top portion of the tab 52. The outward catch 58 projects upwardly and outwardly from the base 48 of the pin protector plate 18 and projects at an angle from the top portion of the tab 52.

The inward catch 56 is a ramp shaped member having an outer surface sloped at a negative angle with respect to the top of the tab 52. The inward catch 56 includes an inner catch surface 56a that projects inwardly with respect to the center of the base 48 and is disposed on a plane that is generally parallel to the plane of the base 48. In one aspect, the inward catch 56 is an elongated member formed as monolithic piece. In one aspect, the inward catch 56 is a pair of inward catches 56, each of the pair of inward catches 56 are spaced apart from each other and disposed on a common plane.

Figure 6:
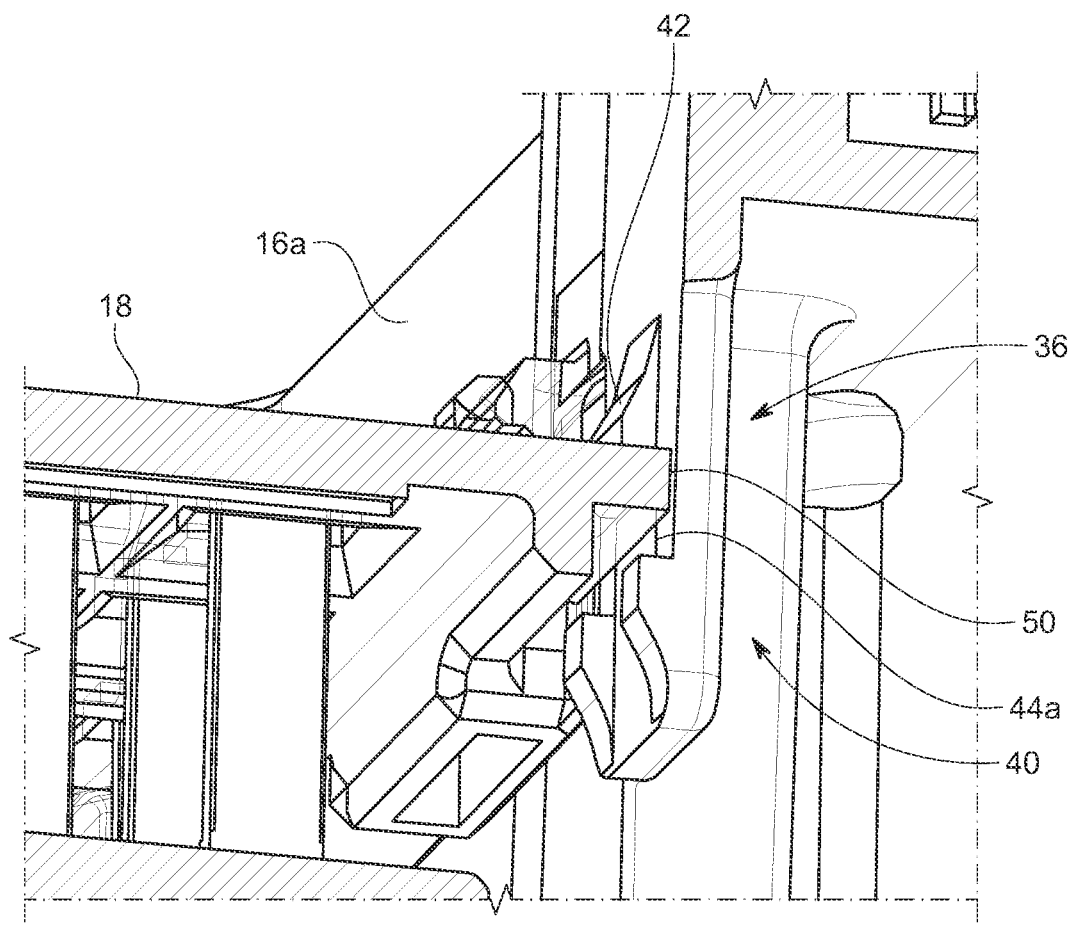
FIG. 6 is a cross-sectional view of FIG. 2 taken along line 6-6 showing the pin protector plate in a pre-stage position.

The pin protector plate 18 is movable from a locked position to a pre-stage position. In the locked position the peripheral catch 50 of the pin protector plate 18 is disposed beneath the resilient finger 36 and the female connector housing 12 is seated against the pin protector plate 18. The protruding member 22 is also disposed under the engagement member 40. In the pre-stage position, the pin protector plate 18 is engaged with the engagement member 40 as shown in FIG. 6. In particular, the peripheral catch 50 is disposed between the first catch surface 42a and the second catch surface 44a of the corresponding upper ramp 42 and lower ramp 44.

In one aspect, the tab 52 has a travel configured to place the peripheral catch 50 of the pin protector plate 18 into engagement with the engagement member 40 of the resilient finger 36 when the upper catch 38 pulls the tab 52 free of engagement with the retention member 24 of the female connector housing 12. The travel is defined by the distance of a movement of the pin protector plate 18 from a locked position to the engagement of the outward catch 58 of the tab 52 with the upper catch 38 of the male connector housing 14. It should also be appreciated that the distance between the first catch surface 42a and the second catch surface 44a of the upper ramp 42 and lower ramp 44 is greater than a height of the peripheral catch 50 so as to position the pin protector plate 18 in such a manner that the outward catch 58 is beneath the upper catch 38 of the male connector housing 14.

With reference now to FIGS. 6 and 7A-12C a description of the operation of the connector assembly housing 10 is provided. The connector assembly is configured to place the pin protector plate 18 in the pre-stage position after the female connector housing 12 has been removed. In particular, when the female connector housing 12 is pulled out of the male housing, the female connector housing 12 is configured to: (1) move the pin protector plate 18 from the locked position to the pre-stage position; and (2) disengage from the pin protector plate 18.

The pin protector plate 18 is moved to the pre-stage position by the protruding member 22 engaging the resilient finger 36 and urging the resilient finger 36 outwardly. Concurrently, the retention member 24 engages the tab 52 so as to carry the pin protector plate 18 upwardly.

The pin protector plate 18 is carried upwardly by the retention member 24 until the tab 52 engages the upper catch 38. The upper catch 38 pulls the tab 52 away from the retention member 24 releasing the tab 52 from the retention member 24. Concurrently, the protruding member 22 is pulled clear of the engagement member 40 so as to place the resilient finger 36 and the tab 52 to a natural state and the peripheral catch 50 of the pin protector plate 18 is engaged with the engagement member 40.

Figure 7B:
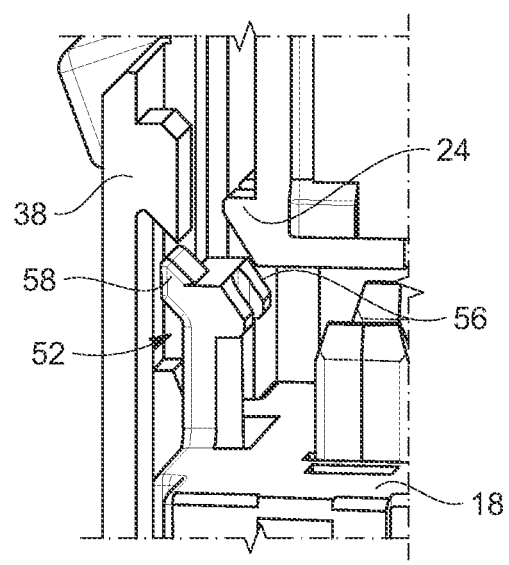
FIG. 7B is a close up view of FIG. 7A showing the position of the female connector housing with respect to the tab of the pin protector plate.

With reference first to FIGS. 6 and 7A-9B, a description of the insertion of the female connector housing 12 into the male connector housing 14 is provided. FIG. 7A shows the pin protector plate 18 in the pre-stage position wherein the pin protector plate 18 is suspended above the lower plate 32 of the male connector housing 14. In the pre-stage position, the male terminal blades 208 are seated within the terminal slots of the pin protector plate 18. The pin protector plate 18 is positioned above the lower plate 32 so as to help prevent the male terminal blades 208 from being bent due to handling. FIG. 6 shows the pin protector plate 18 in the pre-stage position. In the pre-stage position, the peripheral catch 50 is supported by the second catch surface 44a of the lower ramp 44 of the engagement member 40. FIGS. 7A and 7B show the female connector housing 12 inserted into the male connector housing 14 with the pin protector plate 18 disposed therebetween. FIG. 7B shows that the retention member 24 of the female connector housing 12 is positioned above the inward catch 56 and the tab 52 is free of the upper catch 38 when the pin protector plate 18 is in the pre-stage position.

Figure 8A:
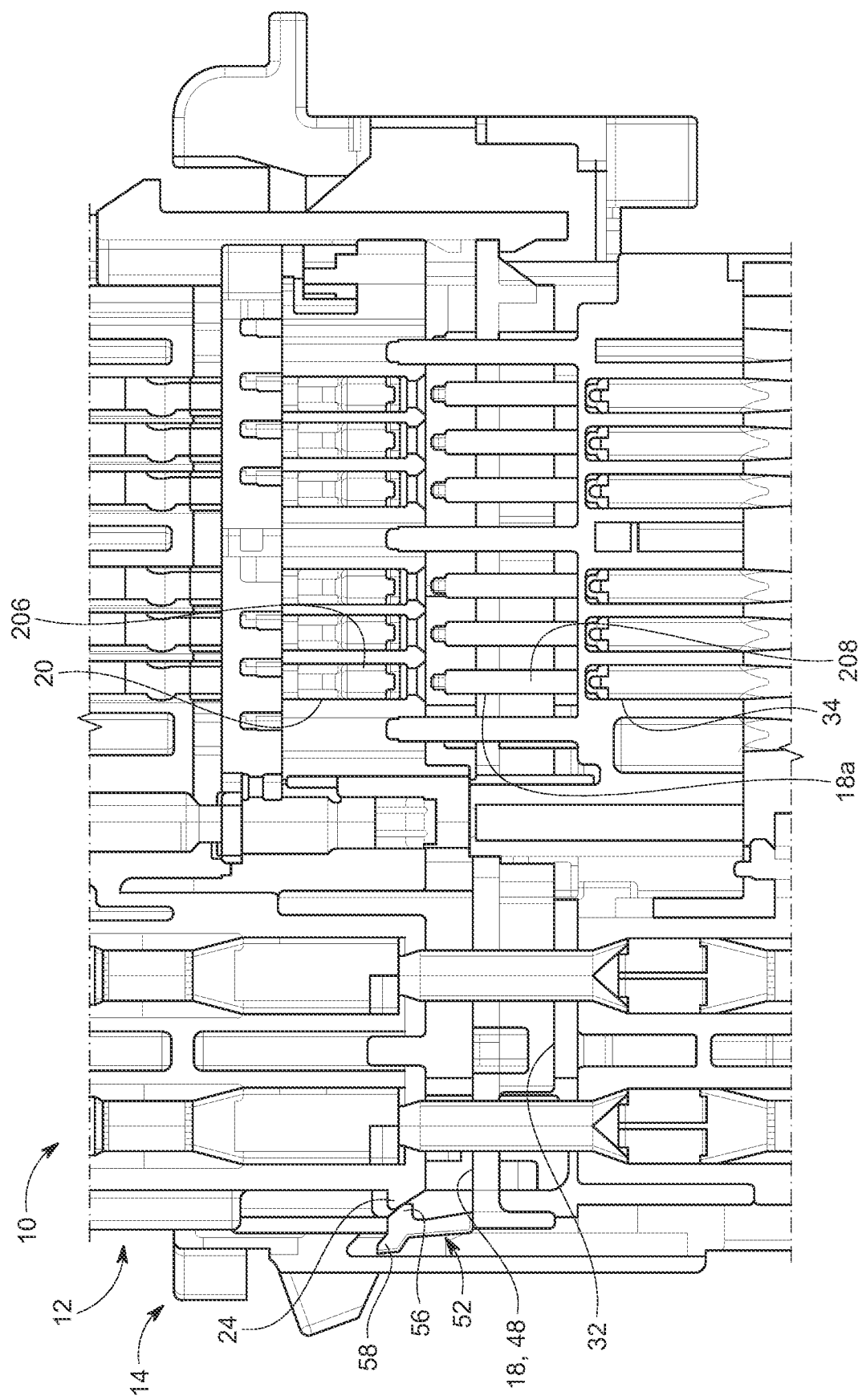
FIG. 8A is a cross-sectional view showing the female connector housing engaging the tab of the pin protector plate.
Figure 8B:
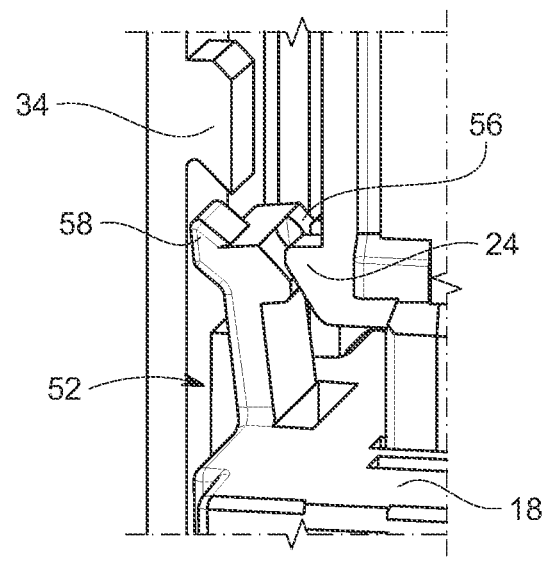
FIG. 8B is a close up view of FIG. 8A showing the female connector housing engaging the tab of the pin protector plate.
Figure 8C:
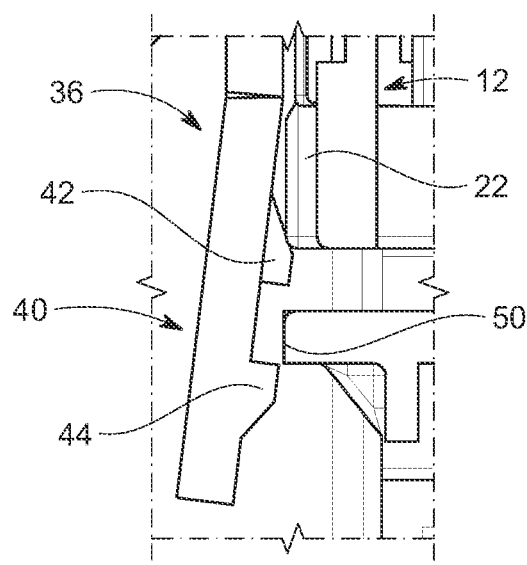
FIG. 8C is a close up view of FIG. 8A showing the protruding member engaging the engagement feature of the resilient finger.

FIGS. 8A-8C show the female connector housing 12 advanced further downward into the male connector housing 14 relative to FIGS. 7A and 7B. FIG. 8B shows the retention member 24 engages the tab 52 of the pin protector plate 18 so as to deflect the tab 52 outwardly with respect to base 48 of the pin protector plate 18. FIG. 8C shows the protruding member 22 of the female connector housing 12 engages the upper ramp 42 so as to deflect the resilient finger 36 outwardly with respect to the inner wall 16 concurrently with the engagement of the retention member 24 and the tab 52. The engagement member 40 is cleared of the peripheral catch 50 of the pin protector plate 18 so as to allow the peripheral catch 50 of the pin protector plate 18 to be pushed past the engagement member 40 of the resilient finger 36.

Figure 9A:
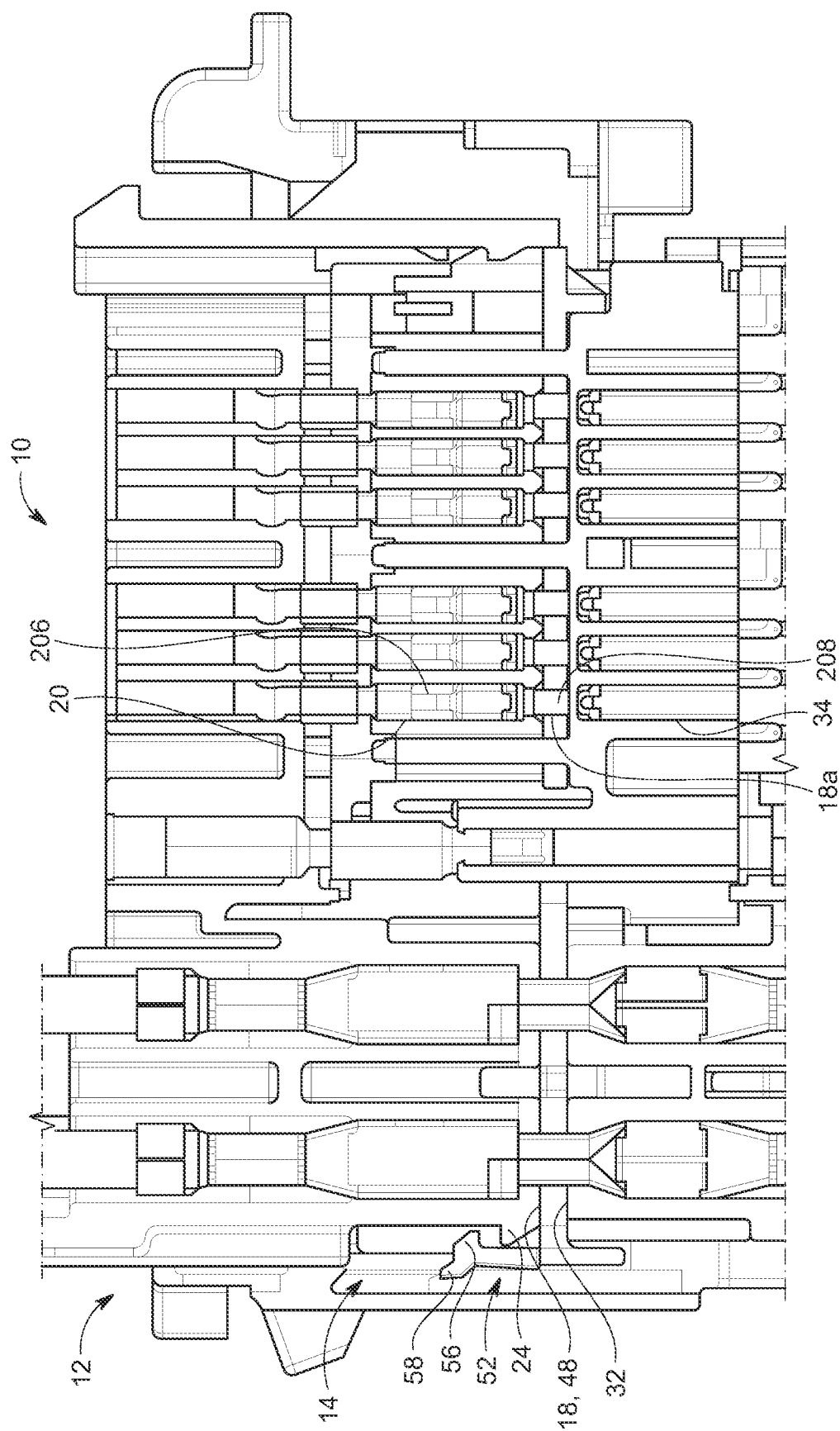
FIG. 9A is a cross-sectional view showing the connector assembly in a locked position.
Figure 9B:
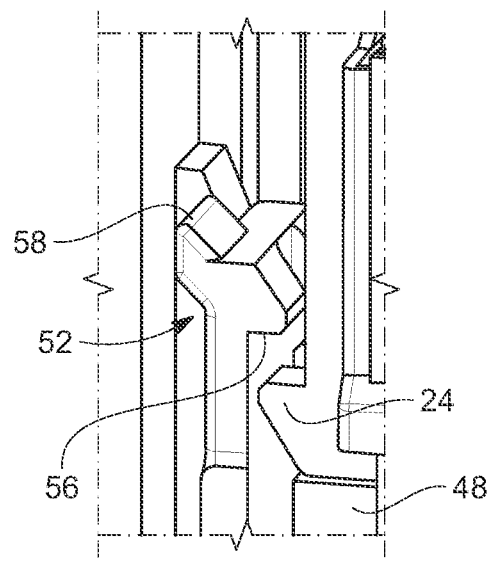
FIG. 9B is a close up view of FIG. 9A showing the retention member disposed underneath the tab of the resilient finger.
Figure 9C:
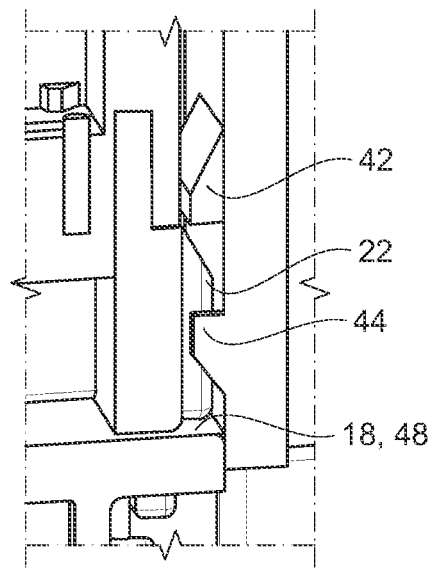
FIG. 9C is a close up view of FIG. 9A showing the base of the pin protector plate disengaged with the engagement feature of the resilient finger.

FIG. 9A shows the pin protector plate 18 in the locked position. The female connector housing 12 is fully seated into the male connector housing 14, wherein the pin protector plate 18 is fully seated against the lower plate 32 and the bottom of the female connector housing 12 is seated against the base 48 of the pin protector plate 18. FIG. 9B shows that the retention member 24 is disposed beneath the inward catch 56 of the tab 52 of the pin protector plate 18. FIG. 9C shows the pin protector plate 18 in the locked position, wherein the peripheral catch 50 of the pin protector plate 18 is seated beneath the engagement member 40 of the resilient finger 36. In particular, the resilient finger 36 is returned from its deflected position shown in FIG. 8C to its natural position. The peripheral catch 50 is seated beneath the lower ramps 44 of the engagement member 40 and the protruding member 22 of the female connector is seated between the pair of lower ramps 44 and underneath the upper ramp 42.

Figure 10A:
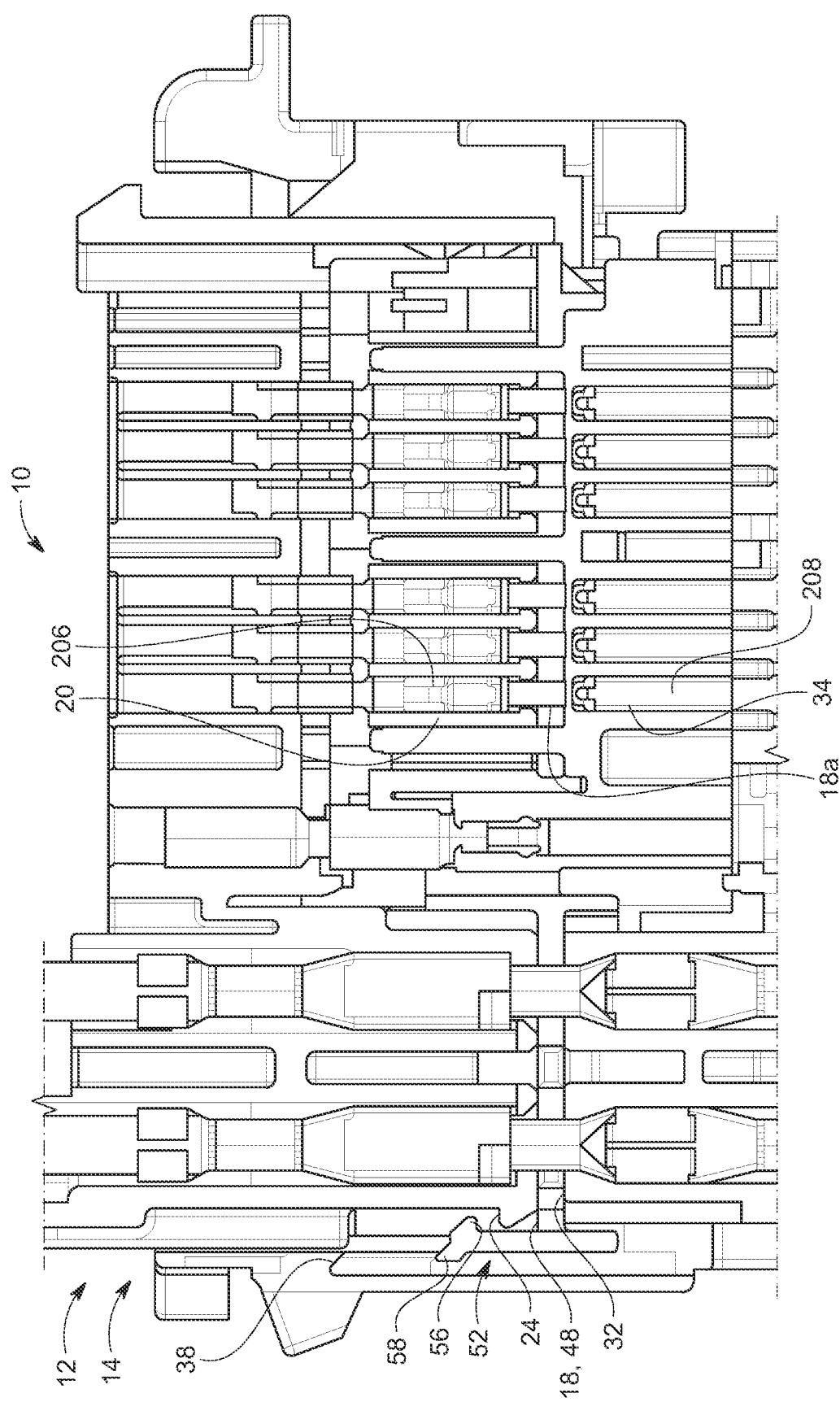
FIG. 10A is a cross-sectional view showing the connector assembly being pulled from the locked position.
Figure 10B:
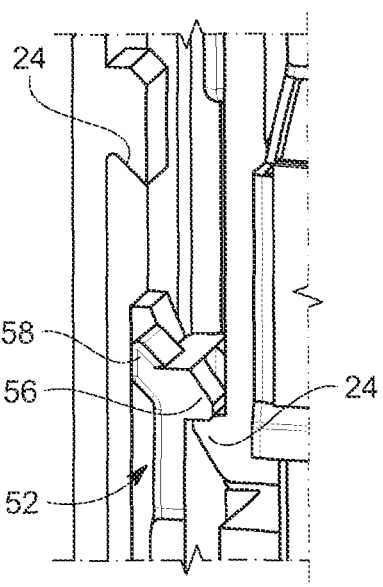
FIG. 10B is a close up view of FIG. 10A showing the retention member engaged with the tab.

FIGS. 10A-12B provide an illustration of the operation of the connector assembly when the female connector housing 12 is removed. FIG. 10A shows the pin protector plate 18 in the locked position. In the locked position, the retention member 24 is seated beneath the inward catch 56 and free of the inward catch 56. FIG. 10B illustrates the female connector housing 12 being raised relative to FIG. 10A, wherein the female connector housing 12 is raised, the retention member 24 is pulled up into engagement with the inward catch 56 of the tab 52. As the female connector housing 12 is raised, the retention member 24 engages the inward catch 56 so as to lift the pin protector plate 18 with the female connector housing 12.

Figure 11B:
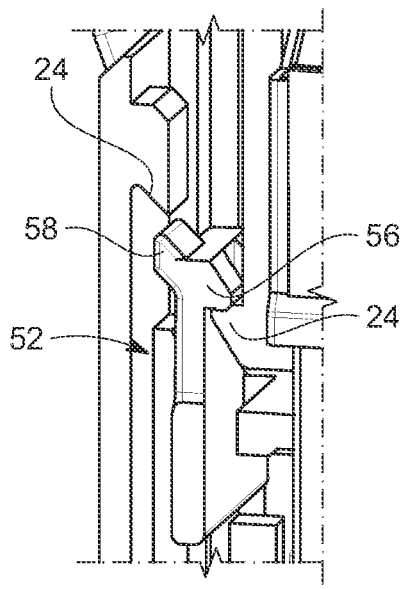
FIG. 11B is a close up view of FIG. 11A showing the tab about to engage the upper catch.
Figure 11C:
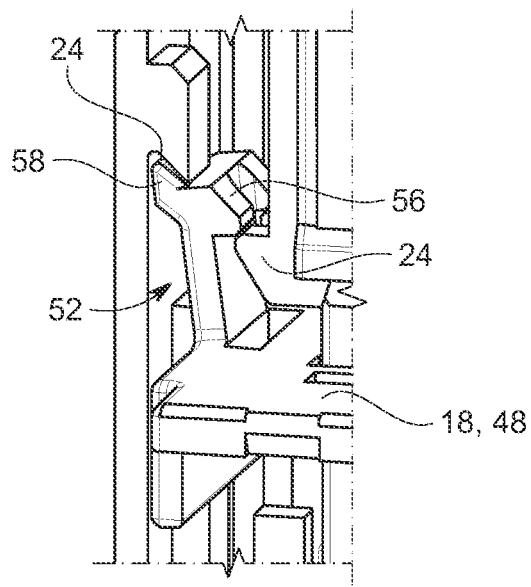
FIG. 11C is a close up view of FIG. 11A showing the upper catch disengaging the tab from the retention member.

FIG. 11A shows the female connector housing 12 advanced upwardly relative to FIG. 10A. As the female connector housing 12 is being pulled up, the upper catch 38 of the male connector housing 14 is configured to disengage the tab 52 from engagement with the retention member 24. FIG. 11B shows the female connector housing 12 being pulled upward so as to position the outward catch 58 of the tab 52 into engagement with the upper catch 38 of the male connector housing 14. FIG. 11C shows the upper catch 38 engaging the outward catch 58 of the tab 52 wherein the outward catch 58 is pulled outwardly so as to release the inward catch 56 from the retention member 24.

Figure 12A:
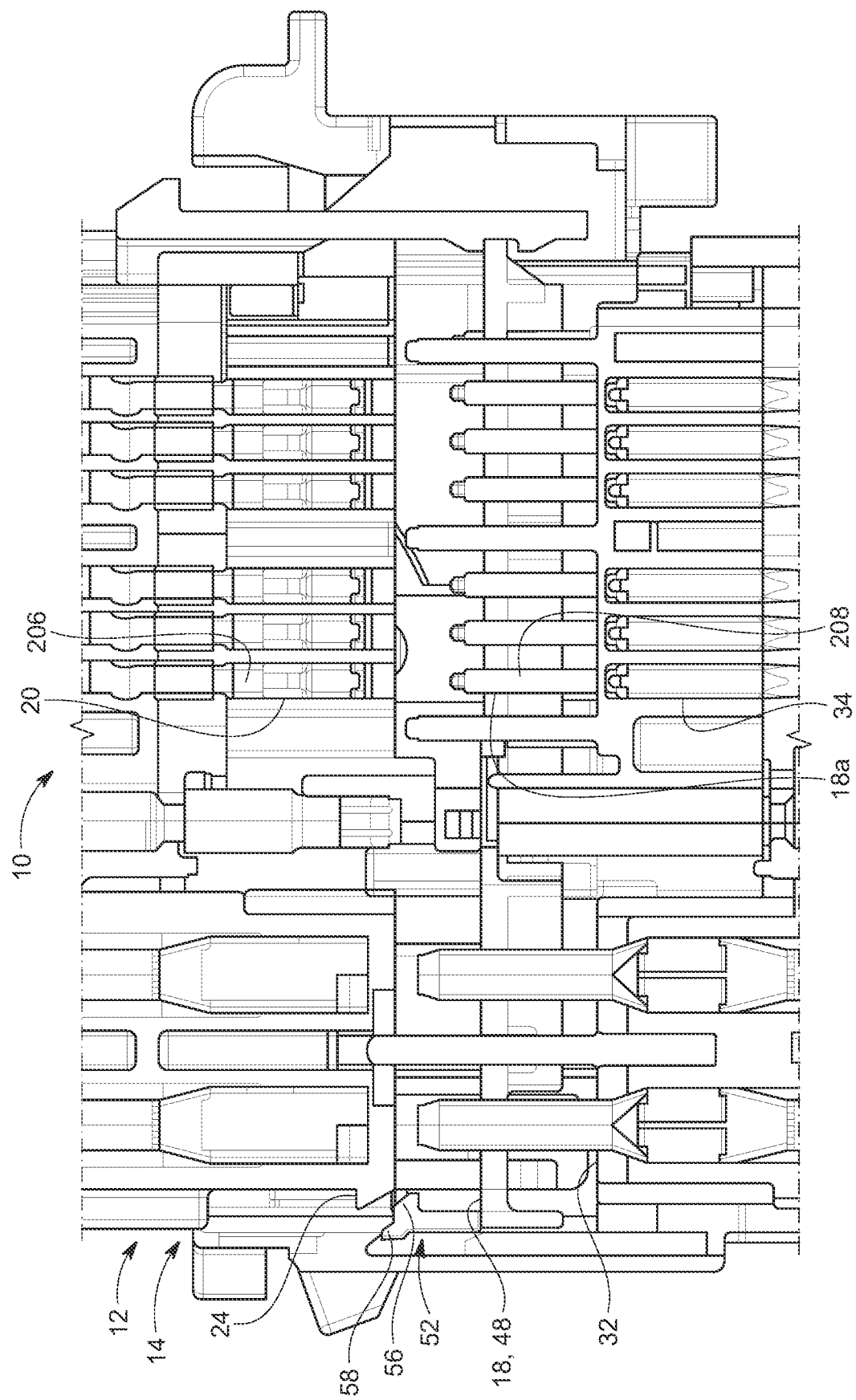
FIG. 12A is a cross-sectional view showing the connector assembly in a pre-stage position.
Figure 12B:
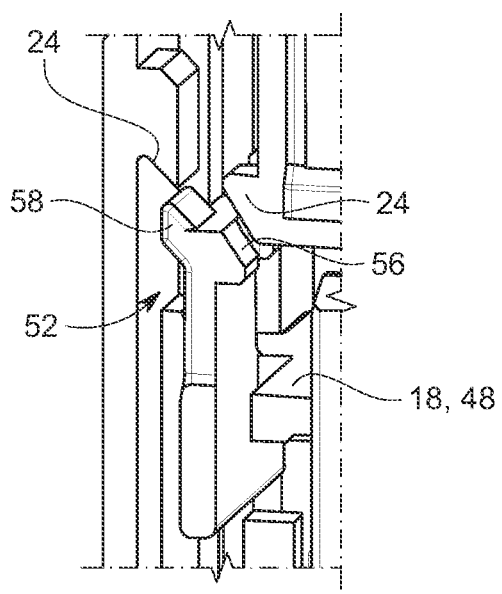
FIG. 12B is a close up view of FIG. 12A showing the tab disengaged from the upper catch.

FIGS. 12A and 12B show the female connector housing 12 disengaged from the pin protector plate 18 and the pin protector plate 18 in the pre-stage position. FIG. 12B shows the tab 52 of the pin protector plate 18 in a natural position and the retention member 24 of the female connector housing 12 disposed above the inward catch 56 of the tab 52.

As the female connector housing 12 is pulled out the protruding member 22 of the female connector housing 12 engages the upper ramp 42 of the resilient finger 36, deflecting the resilient finger 36 outwardly, as shown in FIG. 8C. As the protruding member 22 passes the upper ramp 42, the resilient finger 36 is returned to the natural position as shown in FIG. 6. Concurrently, the pin protector plate 18 is no longer being carried by the female connector housing 12 and the peripheral catch 50 of the pin protector plate 18 is seated between the first catch surface 42*a* and second catch surface 44*a* of the corresponding upper ramp 42 and the lower ramp 44. The tab 52 is then positioned underneath the upper catch 38 as shown in FIG. 7*b*.

Accordingly, a connector assembly is provided which places the pin protector plate 18 in a pre-stage position by simply removing the female connector housing 12, thus the male terminal blades 208 remain protected during the servicing of the connector assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

I claim:

1. A connector assembly comprising:
   a male connector housing having a wall bounding a space and a resilient finger having an engagement member spaced apart from an upper catch;
   a female connector housing having a protruding member axially offset from a retention member;
   a pin protector plate disposed between the male connector housing and the female connector housing, the pin protector plate having a tab and a base having a peripheral edge defining a peripheral catch, the tab projecting upwardly from the base and axially offset from the peripheral catch, wherein the pin protector plate is movable from a locked position to a pre-stage position, wherein;
   in the locked position the peripheral catch of the pin protector plate is disposed beneath the resilient finger and the female connector housing is seated against the pin protector plate and the protruding member is also disposed under the engagement member;
   in the pre-stage position, the pin protector plate is engaged with the engagement member; and
   wherein when the female connector housing is pulled out of the male connector housing, the female connector housing is configured to: (1) move the pin protector plate from the locked position to the pre-stage position; and (2) disengage from the pin protector plate; and
   wherein the protruding member urges the resilient finger outwardly, the retention member engaging the tab so as to carry the pin protector plate until the tab engages the upper catch, the upper catch pulling the tab away from the retention member, wherein the resilient finger and the tab are returned to a normal state and the peripheral catch of the pin protector plate is engaged with the engagement member.

2. The connector assembly as set forth in claim 1, wherein the engagement member includes an upper ramp defining a first catch surface and a lower ramp defining a second catch surface.

3. The connector assembly as set forth in claim 2, wherein the upper catch is elevated with respect to the engagement member.

4. The connector assembly as set forth in claim 3, wherein the upper catch is axially offset from the engagement member.

5. The connector assembly as set forth in claim 4, wherein the upper ramp projects inwardly in a direction from a top surface to a bottom surface of the resilient finger, and the lower ramp projects inwardly in a direction from the bottom surface to the top surface of the resilient finger.

6. The connector assembly as set forth in claim 5, wherein the lower ramp is a pair of lower ramps spaced apart from each other and coaxial to each other.

7. The connector assembly as set forth in claim 1, wherein the protruding member is a cuboidal member having an arcuate top surface.

8. The connector assembly as set forth in claim 7, wherein the retention member includes a planar surface generally orthogonal to a side surface of the retention member.

9. The connector assembly as set forth in claim 8, wherein the female connector housing includes a rib disposed on a side surface of female connector housing, the protruding member and the retention member disposed on an undersurface of the rib.

10. The connector assembly as set forth in claim 1, wherein the pin protector plate includes a peripheral wall bounding a periphery of the base.

11. The connector assembly as set forth in claim 10, wherein the peripheral catch is defined by an indent disposed on a top surface of the base.

12. The connector assembly as set forth in claim 11, wherein the tab is a planar member having an inward catch and an outward catch, the inward catch and the outward catch disposed on a top portion of the tab.

13. The connector assembly as set forth in claim 12, wherein the outward catch projects upwardly at an angle from the top portion of the tab.

14. The connector assembly as set forth in claim 13, wherein the inward catch is a pair of inward catches, each of the pair of inward catches spaced apart from each other.

15. The connector assembly as set forth claim 14, wherein the tab has a travel configured to place the peripheral catch of the pin protector plate into engagement with the engagement member of the resilient finger when the upper catch pulls the tab free of engagement with the retention member of the female connector housing.

* * * * *